United States Patent [19]

Collins

[11] 4,165,647

[45] Aug. 28, 1979

[54] SCAN ACOUSTICAL HOLOGRAPHIC APPARATUS AND METHOD

[75] Inventor: H. Dale Collins, Richland, Wash.

[73] Assignee: International Submarine Services, London, England

[21] Appl. No.: 905,234

[22] Filed: May 12, 1978

[51] Int. Cl.[2] .......................................... G01N 29/04
[52] U.S. Cl. .................................... 73/603; 340/5 H
[58] Field of Search ................ 73/603, 625, 626, 628; 340/5 H; 343/7.9, 17

[56] References Cited

U.S. PATENT DOCUMENTS

| 3,792,423 | 2/1974 | Becker et al. | 340/5 MP |
| 4,021,771 | 5/1977 | Collins et al. | 340/5 H |

Primary Examiner—Anthony V. Ciarlante
Attorney, Agent, or Firm—Wells, St. John & Roberts

[57] ABSTRACT

A scan acoustical holographic apparatus and method is described for sequentially acoustically scanning the interior of an optically opaque volume. The apparatus includes an array of acoustical transducers that are coupled to the volume. A plurality of frequency divider means receive high frequency clock pulses and generate transmit electrical pulse signals to the transducers having a frequency that is a fraction of the clock pulse frequency. The phases of the transmit signals are controlled by programmable read-only-memories in accordance with the distances between the transducers and selected focal points within the volume to effectively focus the transducers on the focal point. Receive signals are mixed with the phase adjusted transmit signals to effectively focus the transducers during a receive mode and to generate high amplitude holographic signals when the receive signals are in phase with the phase altered transmit signals. The resultant holographic signals are electronically processed to form an electronic analogue hologram which is utilized to visually display a holographic image of the interior of the volume.

22 Claims, 4 Drawing Figures

SCAN ACOUSTICAL HOLOGRAPHIC APPARATUS AND METHOD

BACKGROUND OF THE INVENTION

The present invention relates to techniques for acoustically scanning the interior of a volume and more specifically for presenting visual images of the material using scan techniques commonly referred to as B-scan, C-scan and scanned acoustical holography.

Such techniques are presently being utilized in varying degrees for medical diagnosis and for nondestructive testing of optically opaque materials (liquids and solids) in which an acoustical pulse transmitter/receiver is scanned over the material. Generally the images from the B-scan and C-scan techniques are displayed on a cathode ray tube (CRT) in two dimensional form with B-scan display systems showing a two dimensional depth cross section (X-Z plane or Y-Z plane) and the C-scan display system showing a two dimensional plan view (X-Y plane). In both systems the lapsed time of the acoustical pulse traveling from the transmitter to the attenuated surface or internal discontinuity back to the receiver and the amplitude of the reflected acoustical signal are measured. Examples of such techniques are disclosed in the Becker et al U.S. Pat. No. 3,792,423 granted February, 1974. A scanned holographic system is disclosed in the Collins et al U.S. Pat. No. 4,021,771 granted May, 1977.

One of the principal shortcomings of such scanning is the excessive time required to effectively scan the volume to form a hologram, either in physical or electronic form. A further shortcoming of such scanning technique is the difficulty of acoustically scanning the interior of an object having a contoured surface.

One of the principal objects of this invention is to provide a unique scan acoustical holographic apparatus to overcome the objections cited above.

Other advantages of this invention will become apparent upon reading the following detailed description of a preferred embodiment.

BRIEF DESCRIPTION OF THE DRAWINGS

A preferred embodiment of this invention is illustrated in the accompanying drawings, in which.

DETAILED DESCRIPTION OF A PREFERRED EMBODIMENT

Figure 1:
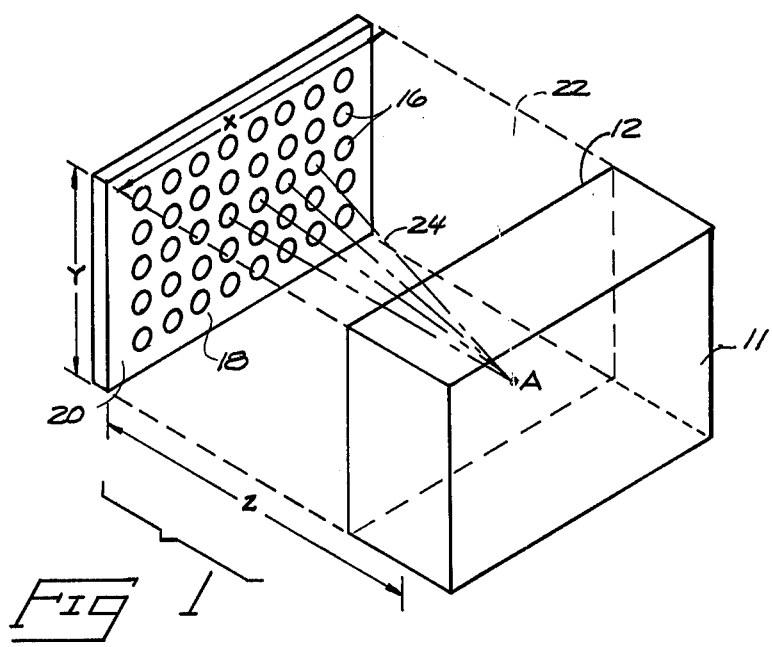
FIG. 1 is an illustrative and schematic isometric view of an array of acoustical transducers for sequentially scanning a volume.
Figure 2:
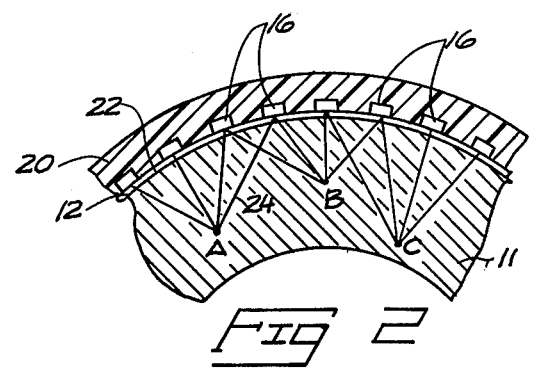
FIG. 2 is an illustrative cross-sectional view of a volume having a curved surface showing the arrangement of the array of acoustical transducers to accommodate the curvature of the volume surface.
Figure 4:
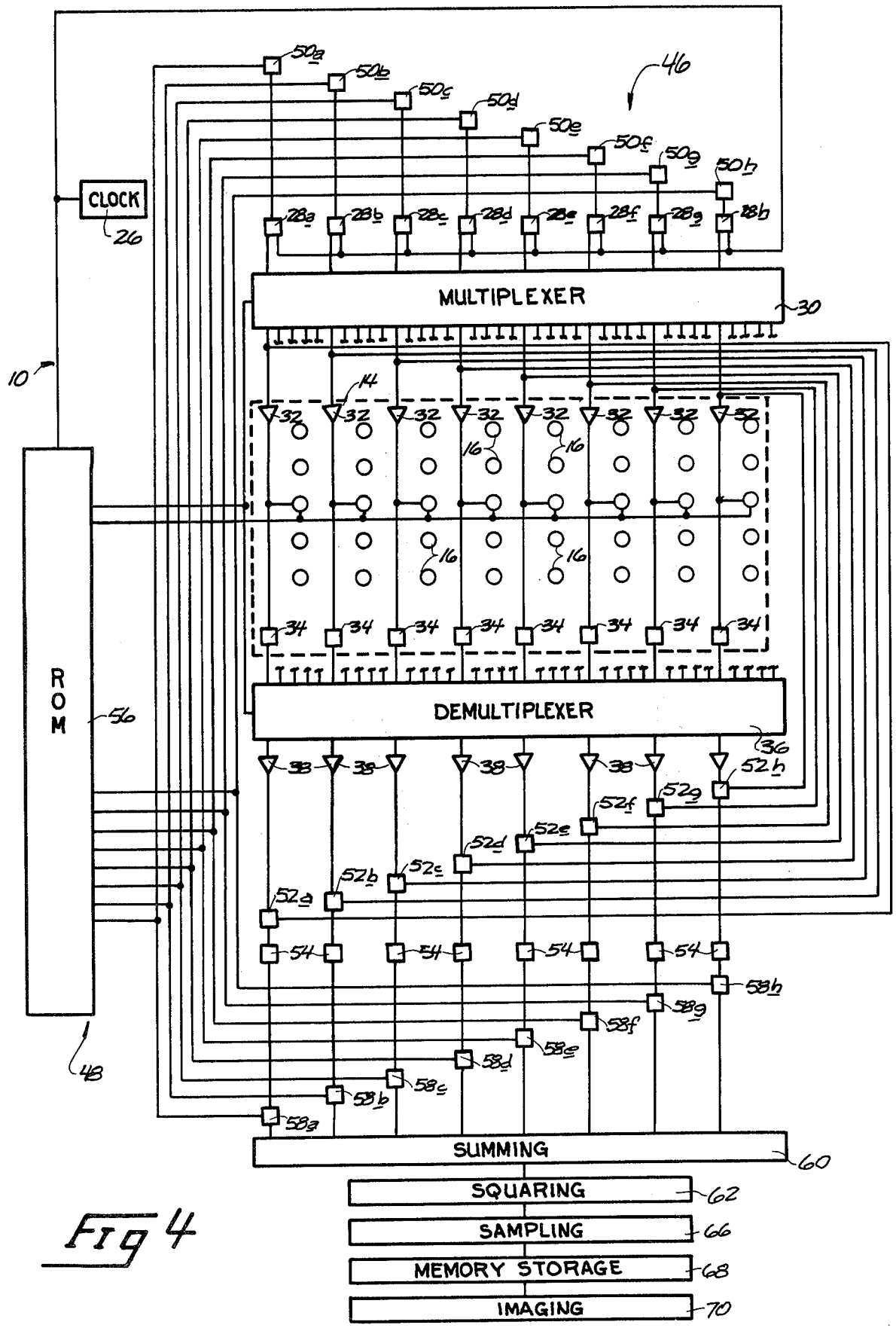
FIG. 4 is a schematic block diagram view of a preferred embodiment of the invention for displaying a visual image of the interior of the volume that has been illuminated with acoustical energy.

Referring now in detail to the drawings, there is illustrated schematically in FIG. 4 a scan acoustical holographic apparatus 10 for acoustically inspecting a volume 11 (FIGS. 1 and 2). The volume may be a solid object in which it is desired to inspect the interior of the volume or the volume may include an object that is within the volume. The apparatus is principally intended to inspect the interior of a solid volume having a face surface 12.

Figure 3:
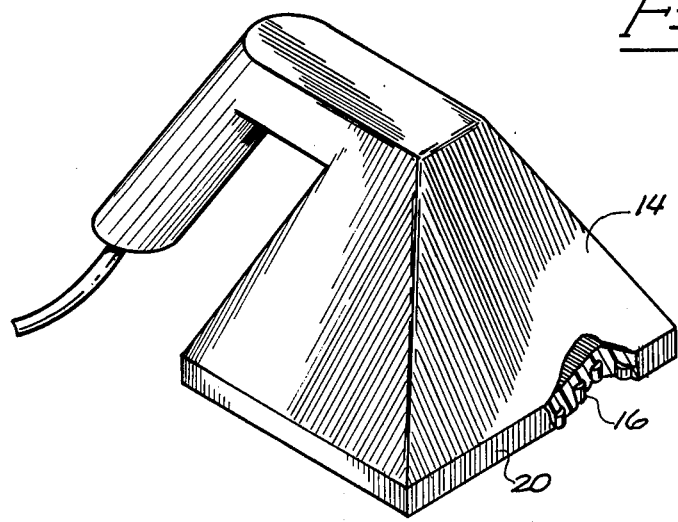
FIG. 3 is an isometric view of a portable hand held scanning probe for use in scanning a volume having a curved or irregular surface.

The apparatus 10 includes a probe 14 (FIG. 3) that is preferably portable and may be hand held to enable an operator to move the probe to various locations on the face surface to inspect the volume 11.

The probe 14 includes acoustical transducers 16 for receiving transmit pulse electrical signals from an electronic control system and for directing pulsed beams of acoustical energy into the volume and for receiving reflected pulse acoustical beams from the interior of the volume such as a discontinuity. Upon receipt of the reflected beam, the transducer generates an electrical signal, the amplitude of which is proportional to the beam intensity.

The transducers 16 preferably are formed in a generally two dimensional array 18 illustrated schematically in FIGS. 1 and 2. For purposes of description, the array is formed in a generally X and Y two dimensional array with the transducers directing the acoustical energy in a depth or Z direction. Preferably the individual acoustical transducers are positioned in identifiable columns and rows. For purposes of illustration, the acoustical transducers in FIG. 1 are formed in eight columns and five rows.

The acoustical transducers 16 are preferably mounted securely in a flexible backing material 20 to enable the array to be positioned in conformity to the face surface 12 as illustrated in FIG. 2. In FIG. 2 the face surface 12 is illustrated as a curved surface with the array 18 being formed in a curved arrangement complementary to the contour of the face surface 12. The backing material 20 may be of a flexible elastomer material with the individual acoustical transducers molded or mounted securely within the backing material.

Preferably the apparatus includes means for supplying an acoustical coupling material 22 between the transducers and the face surface 12 to minimize attenuation of the acoustical energy.

The apparatus 10 is designed to sequentially activate various combinations of acoustical transducers so as to sequentially focus combinations of the transducers 16 on spaced focal points to sequentially scan the volume. In FIG. 1, four of the acoustical transducers are illustrated generating a focused acoustical beam 24 having a focal point A. The apparatus 10 sequences the activation of the combinations of acoustical transducers to sequence the inspection of portions of the volume 11 with each volume having a preselected focal point A, B, C etc. The selection and sequencing of the transducers is accomplished by electronic means to three dimensionally scan the volume with each focal point having a different coordinate (X, Y, and Z) location. For some applications it may be desirable to sequentially B-scan the volume in which the scanning is accomplished along a series of X-Z planes or Y-Z planes or it may be desirable to sequentially C-scan the volume in X-Y planes with different focal lengths for each plane. In a preferred embodiment it is desirable to obtain phase information of the reflected acoustical wave energy to obtain holographic information of the volume.

The electronic means for sequentially scanning the volume includes a clock means 26 for generating clock pulses at regular intervals at a desired high frequency, such as 64 Mhz. The clock means 26 is operatively connected to a plurality of electronic frequency-divider means 28 that are associated with corresponding acoustical transducers 16. In a preferred embodiment, each electronic frequency divider 28 is associated with each transducer in a particular column. For purposes of illustration in FIG. 4, the electronic frequency-dividers 28 are identified individually by letters a-h. In some embodiments, it may be desirable to utilize a separate electronic-frequency divider 28 for each acoustical transducer 16. The electronic frequency-divider means 28 receives the high frequency clock pulses from the clock means 26 and generates a low frequency transmit pulse signal that has a frequency that is a fraction of the clock pulse. In one embodiment, the frequency-divider means 28 generates a transmit pulse signal having a frequency that is 1/32 of the frequency of the clock pulses or 2 Mhz.

The electronic means includes, in a preferred embodiment, a multiplexer 30 for sequencing the application of the transmit pulse signals sequentially to the transducers of the various rows. The transmit pulse signals are then applied to individual transmit amplifiers 32 for driving the transducers to generate and direct the acoustical wave energy into the volume.

When the transmitted acoustical wave energy impinges upon a discontinuity, reflected acoustical beams are generated that are reflected back to the acoustical transducers 16. The acoustical transducers 16 then produce received pulse signals in response to the reflected acoustical pulses. Because of the substantially large magnitude of the transmit signal, isolation circuits 34 are utilized to discriminate and filter out the influence of transmit signal in the received circuitry. The received signals are processed through a demultiplexer 36 that is indexed complementary to a multiplexer 30 for sequencing the receive signals from row-to-row. The received signals passing from the demultiplexer 36 are amplified by receive amplifiers 38.

The electronic means includes an electronic scan control means for adjusting the phase of the transmit signals to the acoustical transducers 16 in such a manner as to effectively focus the acoustical beams from the selected transducers to a selected focal point. Further, the electronic scan control means sequences the activation of the selected combination of the acoustical transducers to sequentially scan the volume a portion at a time to obtain acoustical holographic information from the volume. The electronic scan control means includes a phase control means generally designated with the numeral 46 and a sequencing control means generally designated with the numeral 48 (FIG. 4).

The phase control means 46 preferably includes a plurality of erasable programmable read-only-memory (EPROM) means 50 that are associated with corresponding transducers and corresponding electronic frequency-divider means 28 for controlling and adjusting the phases of the transmit pulse signals in relation to the distances between the corresponding acoustical transducers and the selected focal points. The objective is to have the acoustical wave energy generated by each selected combination of transducers to be in phase at the selected focal point. The focused acoustical energy concentrates acoustical energy at the focal point in order to obtain high contrast acoustical information. Additionally, the phase control means 46 includes a plurality of balanced mixer means 52 (associated with corresponding transducers) that are positioned in the receive circuitry for mixing the phase adjusted transmit pulse signals with corresponding receive signals.

In response to the phase adjusted transmit pulse signals and received pulse signals, each balance mixer means 52 generates a resultant holographic signal containing holographic information from that portion of the volume identified with the selected focal point as received by a corresponding acoustical transducer 16. When the receive signal is in phase with the phase adjusted transmit signal, the resultant holographic signal has maximum amplitude. Consequently, the balance mixer means 52 serve to effectively focus the selected acoustical transducers in the receive mode to emphasize the reflected acoustical energy originating at the focal point or generated within the selected portion of the volume and to filter out or deemphasize reflected energy received from outside the selected portion. Stated another way, if the acoustical wave energy is reflection from the location of the focal point, a high amplitude holographic signal is generated which provides for high amplitude processing which in effect filters out acoustical wave energy received from portions of the volume outside the selected volume portion.

The resultant holographic signals are processed through low pass filters 54 to remove high frequency waves that may be carried on the signal.

The sequence control means 48 preferably includes a master read-only-memory (ROM) means 56 that is operatively connected to the transducers 16 for sequencing each combination of transducers in a programmed schedule to sequentially focus the beams at the desired focal points to three dimensionally scan the volume 11. During the scanning sequence, the ROM 56 indexes the multiplexer 30 and the demultiplexer 36 from row to row. The ROM 56 also programs the EPROMS 50 to adjust the phases of the transmit signals in accordance to the distances from the corresponding acoustical transducers to the selected focal points. The EPROMS 50 in effect control and adjust the phases of the transmit signals generated by the frequency-divider means 28.

Additionally the sequence control means 48 includes signal sampling means 60 that are associated with corresponding transducers 16 and balance mixers 52 for time sampling the resulting holographic acoustical signals from the balance mixers 52. The time sampling is controlled by the ROM 56 to time sample the signal at the probable time of maximum amplitude. The signal sampling means 58 produces a time sampled holographic signal from each transducer of the selected combination.

The scan acoustical holographic apparatus 10 further includes electronic hologram apparatus for forming a composite hologram of the volume. Such electronic hologram means includes summing means 60 for receiving the time sampled holographic signals from the sampling means 58 and forming a composite holographic signal for each portion of the volume identified by a selected coordinate focus point. The summing means 60 effectively sums the amplitude of the individual holographic signals from each selected transducer and provides for a composite signal. The composite holographic signal is then presented to electronic squaring means 62 for squaring the composite signal to increase the sensitivity and contrast of the composite signal.

The electronic hologram means includes a hologram formation means for receiving the squared composite holographic signal for each portion of the volume and for forming a permanent physical hologram or an electronic analogue hologram which may be stored or presented as a visual image on a real time basis. The hologram formation means preferably includes a signal sampling means 66 for sequentially sampling the individual squared, composite holographic signals to sequentially feed such signals to an electronic hologram storage means 68.

From the hologram storage means 68 a visual image of the interior of the volume may be presented through a hologram imaging means 70 such as illustrated and described in the Becker et al U.S. Pat. No. 3,792,423 and the Collins U.S. Pat. No. 4,021,771. Both of these patents are incorporated by reference with respect to the technique and apparatus for imaging holographic signals that are obtained from a scan technique. The processed holographic signals are utilized to modulate the brightness input on a CRT display device. Coordinate X, Y and Z electrical distance signals are applied to the horizontal and vertical inputs of the CRT display to form an isometric projection.

As previously mentioned, one of the advantages of this invention is to scan volumes having contoured surfaces. The EPROMS 50 may be programmed and altered from the ROM 56 to adjust the varied phases of the transmit electrical signals based upon the curvature or surface contour of the face surface 12 of the volume 11. This is particularly helpful in detecting discontinuities or weld defects in pipes or similar cylindrical shapes.

An additional advantage is that an operator may easily move the transducer probe 14 over the surface of the volume 11 from one location to another to rapidly inspect rather large objects. The ROM 56 instructs the EPROM 50 as to which portion of the volume is desired to be inspected and the EPROMS control the electronic frequency divider means 28 to vary the phases of the transmit pulse signals to focus the selected combination of transducer at the desired coordinate focal point. Since the EPROMS are erasable, they may be reprogrammed to accommodate various contours of surfaces. The row multiplexer 30 and demultiplexer 36 are used so that the same set of frequency divider means 28, EPROMS 50, balanced mixer means 52, low pass filters 54 and signal sampling means 58 may be utilized for corresponding transducers in each row. Consequently the number of such electronic components may be reduced. However, for some applications it may be desirable to have one of such components for each transducer.

In the context of this specification, the term 'holography' is used to define a method wherein the information bearing signals are mixed with a reference signal as in a balanced mixer or multiplier to produce a resultant signal which is subsequently used for generating an image.

It should be understood that the above described embodiment is simply illustrative of the principals of this invention and that numerous other embodiments may be readily devised without deviating therefrom. Only the following claims are intended to limit or define this invention.

What I claim is:

1. In a scan acoustical holographic apparatus for obtaining holographic information from a volume;

a generally two dimensional array of acoustical transducers for receiving transmit electrical pulse signals and in response thereto directing pulsed acoustical wave energy into the volume during a transmit mode and for receiving reflected pulsed acoustical wave energy from the volume and in response thereto generating received electrical pulse signals during a receive mode;

a clock means for generating clock pulses at regular intervals at a desired clock frequency;

a plurality of frequency-divider means associated with corresponding transducers and operatively connected to the clock means for generating the transmit electrical pulse signals having a desired operating frequency that is a fraction of the clock frequency;

electronic scan control means operatively connected to the frequency divider means and the transducers (1) for selecting various combinations of the transducers with each combination of transducers associated with a portion of the volume having a selected focal point, (2) for adjusting the phases of the transmit electrical signal in relation to the relative distances between the selected transducers on the selected focal point during the transmit mode, (3) for mixing the phase adjusted transmit electrical pulse signals with the received pulse signals to focus the combination of the transducers on the corresponding selected focal point during the receive mode, and (4) for sequencing the combination of transducers during both the transmit and receive modes to sequentially scan each portion of the volume to obtain high contrast holographic information from each portion of the volume.

2. The scan acoustical holographic apparatus as defined in claim 1 wherein the electronic scan controls means includes a plurality of programmable read-only-memory means operatively connected to the frequency-divider means for controlling the phases of the transmit electrical pulse signals to focus each selected combination of transducers on the selected focal point within the volume.

3. The scan acoustical holographic apparatus as defined in claim 2 wherein at least one of the programmable read-only-memory means has erasable program capability.

4. The scan acoustical holographic apparatus as defined in claim 2 wherein the electronic scan control means includes a read-only-memory means operatively connected to the transducers for sequencing the combination of transducers to sequentially scan the volume portion by portion.

5. The scan acoustical holographic apparatus as defined in claim 2 wherein the volume has a contoured face surface and wherein the apparatus has contouring means associated with the array of transducers to enable the array to be arranged in compliance with the surface contour and wherein the programmable read-only-memories are capable of being programmed to control phases of the transmit pulse signals in relation to the contour of the face surface.

6. The scan acoustical holographic apparatus as defined in claim 1 wherein the electronic scan control means includes a plurality of signal mixing means associated with corresponding transducers for mixing the phase adjusted transmit electrical pulse signals with corresponding received pulse signals to effectively focus the combination of transducers on the corresponding selected focal point to produce resultant maximum amplitude holographic signals when the received pulse signals are in phase with the adjusted transmit electrical pulse signals.

7. The scan acoustical holographic apparatus as defined in claim 6 wherein the electronic scan control means includes a plurality of signal sampling means associated with corresponding signal mixing means for timed sampling the amplitude of the holographic signals and wherein the apparatus further comprises amplitude summing means and for producing a composite summed holographic signal for each portion of the volume.

8. The scan acoustical holographic apparatus as defined in claim 7 further comprising hologram means for receiving the composite summed holographic signals for each portion of the volume and producing a hologram of the volume.

9. The scan acoustical holographic apparatus as defined in claim 8 wherein the hologram means includes a data storage means for storing the composite summed holographic signals in a desired sequence to form the hologram.

10. The scan acoustical holographic apparatus as defined in claim 7 further comprising display means for receiving the composite summed holographic signals and for producing a holographic image of the volume.

11. A scan acoustical holographic apparatus for obtaining holographic information of a volume, comprising:
a generally two dimensional array of acoustical transducers for receiving transmit electrical pulse signals and in response thereto directing pulsed acoustical wave energy into the volume in a transmit mode and for receiving reflected pulsed acoustical wave energy from the volume and in response thereto generating receive electrical pulse signals in a receive mode;
a clock means for generating clock pulses at regular intervals at a desired clock frequency;
a plurality of frequency divider means associated with corresponding transducers and operatively connected to the clock means for generating the transmit electrical pulse signals having a desired operating frequency that is a fraction of the clock frequency;
electronic memory control means operatively connected to the frequency divider means and the transducers (1) for selecting various combinations of the transducers, with each combination of transducers associated with a portion of the volume having a selected focal point (2) for sequencing the combination of transducers to scan each portion of the volume and (3) for adjusting the phases of the transmit electrical pulse signals in relation to the relative distances between the selective transducers and the corresponding focal point to focus the combination of transducers on the selected focal point during both the transmit and receive mode;
a plurality of electronic mixing means associated with corresponding transducers for mixing the receive electrical pulse signals with corresponding phase adjusted transmit electrical pulse signals to produce a resultant holographic signal for each selected transducer; and
electronic summing means for receiving holographic signals and for producing a composite holographic signal corresponding to each portion of the volume.

12. The scan acoustical holographic apparatus as defined in claim 11 further comprising hologram means operatively connected to the electronic summing means for receiving the composite holographic signals corresponding to each portion of the volume and forming a hologram of the volume.

13. The scan acoustical holographic apparatus as defined in claim 12 further comprising a hologram imaging means for displaying a visual image of the volume from the hologram of the volume.

14. The scan acoustical holographic apparatus as defined in claim 11 wherein the electronic memory control means includes a plurality of programmable read-only-memory means operatively connected to the frequency divider means for controlling the phases of the transmit electrical pulse signals to focus each selected combination of transducers on a preselected focal point within the volume.

15. The scan acoustical holographic apparatus as defined in claim 14 wherein the electronic memory control means further includes a read-only-memory means operatively connected to the plurality of programmable read-only-memory means and the transducers for selecting the combination of transducers and instructing the programmable read-only-memory means.

16. In a scan method for obtaining holographic information of a volume, arranging a plurality of acoustical transducers in a generally two dimensional array with respect to the volume;
generating clock pulses of a desired clock frequency;
applying the clock pulses to a plurality of frequency divider means associated with corresponding tranducers to produce a plurality of transmit electrical pulse signals of a frequency that is a fraction of the clock frequency;
selecting various combinations of the transducers to be driven by the transmit electrical pulse signals with each combination being associated with a portion of the volume having a selected focal point;
adjusting the phases of the transmit electrical signals in accordance with the distances between the selected transducers and the selected focal point to thereby electronically focus the selected combination of transducers on the selected focal point;
sequencing the various combination of transducers to sequentially direct a plurality of focused acoustical beams into the volume with each acoustical beam being focused on a selected focal point and thereby generate a sequence of reflected pulse acoustical beams that are received by the transducers with the transducers generating receive electrical pulse signals; and
mixing the applied phase adjusted transmit electrical pulse signals with receive electrical pulse signals generated by corresponding transducers to electronically focus the selected transducer during a receive mode and therefrom generate resultant holographic signals, the amplitude of which are maximum when the transmit electrical signal and receive electrical signal are in phase.

17. In the method as defined in claims 16 further characterized by time sampling resultant holographic signals and summing the time sampled resultant holographic signals and producing a composite summed holographic signal for each selected portion of the volume.

18. In the method as defined in claim 17 further characterized by selecting the composite summed holographic signals from each selected portion of the volume and visually displaying a composite holographic image of the volume.

19. In the method as defined in claim 16 wherein the volume has a contoured face surface and wherein the array of transducers are arranged in compliance with the contour of the face surface with the phases of the transmit electrical pulse signals being adjusted accordingly.

20. In the method as defined in claim 16 further characterized by programming a plurality of read-only-memory means associated with corresponding frequency divider means to control the phases of the electrical pulse signals in accordance with the distances between selected transducers and a selected focal point within the volume.

21. In the method as defined in claim 16 further characterized by utilizing an electronic read-only-memory means operatively connected to the transducers for sequencing the various transducers in accordance with the preselected schedule to acoustically scan the volume.

22. In the method as defined in claim 16 wherein the transducers are arranged in an array of columns and rows and where the method is further characterized by using a row multiplexer means for sequentially shifting the transmit electrical signals from one row of transducers to another row of transducers to sequentially scan each row.

* * * * *